United States Patent [19]

Thünker et al.

[11] Patent Number: 4,854,236

[45] Date of Patent: Aug. 8, 1989

[54] TRANSMISSION SYSTEM FOR FORMING CYCLICAL MOTION FROM ROTATIONAL MOTION PRINTING PRESS WITH COUNTERBALANCE FOR TORQUE FLUCTUATION OF GRIPPER FEED DRUM

[75] Inventors: Norbert Thünker, Grosssachsen; Nikolaus Spiegel, Walldorf; Roland Lorenz, Heidelberg; Werner Joss, Linkenheim, all of Fed. Rep. of Germany

[73] Assignee: Heidelberger Druckmaschinen AG, Heidelberg, Fed. Rep. of Germany

[21] Appl. No.: 80,426

[22] Filed: Jul. 31, 1987

[30] Foreign Application Priority Data

Aug. 1, 1986 [DE] Fed. Rep. of Germany ....... 3626185

[51] Int. Cl.⁴ .............................................. B41F 21/10
[52] U.S. Cl. ................................................... 101/411
[58] Field of Search ................................ 101/409–412, 101/230, 231, 232, 246; 74/569, 54, 55

[56] References Cited

U.S. PATENT DOCUMENTS 4,726,253 2/1988 Russell ................................... 74/569

FOREIGN PATENT DOCUMENTS 1263434 9/1966 Fed. Rep. of Germany .
2022245 5/1970 Fed. Rep. of Germany .
3333050 3/1985 Fed. Rep. of Germany .

*Primary Examiner*—J. Reid Fisher
*Attorney, Agent, or Firm*—Herbert L. Lerner; Laurence A. Greenberg

[57] ABSTRACT

Transmission system for forming cyclical motion from rotational motion including a device having a rotating part and at least one control lever set into cyclical motion by rotational motion of the rotating part, the one control lever and the rotating part being in cooperative engagement whereby a varying force is applied to the control lever producing a torque fluctuation in the rotational motion, includes another device for producing cyclical motion, the other device being in operative engagement with the rotating part, and spring means for applying a force to the rotating part so as to compensate for the torque fluctuation.

5 Claims, 4 Drawing Sheets

TRANSMISSION SYSTEM FOR FORMING CYCLICAL MOTION FROM ROTATIONAL MOTION PRINTING PRESS WITH COUNTERBALANCE FOR TORQUE FLUCTUATION OF GRIPPER FEED DRUM

The invention relates to a transmission system for forming cyclical motion from rotary motion, which includes a rotating part, and at least one control lever set into cyclical motion by rotary motion and co-operating with the rotating part positively (with a form lock) or non-positively (with a force lock) and subjected to a non-uniform force which produces a torque fluctuation in the rotational motion.

Such a gear transmission system has become known heretofore from German Published Non-Prosecuted Application (DE OS) 33 33 050. In this prior art publication, the rotating part is a cam plate on which a control lever rolls through the intermediary of a roller rotatably mounted on the control lever. The aforementioned arrangement serves as an advance gripper control system for sheet-fed printing presses, the control lever performing cyclical motion due to the shape of the cam plate; this cyclical motion is used to form a swiveling motion of the pregrippers. In order for the control lever to be in continuous contact with the cam, the control lever is supported on a secondary cam, which is disposed parallel to the first cam and which revolves with the first cam in a fixed ratio of rotational speeds. The support in this connection is accomplished by an intermediary of spring elements having a spring force of such value that, even at high rotational speeds, the control lever is in reliable contact with the first cam.

It has also become known heretofore to provide, instead of a secondary cam and a spring-mounted second cam roller, a spring which acts directly upon the control lever or upon an articulated arrangement post-connected to the control lever, so that the control lever is prevented from lifting away from the cam.

In this case, too, there is a requirement that the spring be so constructed that, even at high press speeds, reliable operation is ensured, i.e. the control lever remains continuously in contact with the cam. However, the action of the spring forces of the aforementioned springs on the cam produces torques about the shaft carrying the cam. These torques vary in magnitude, depending upon the cam shape and the spring force, and may act in both the direction of rotation as well as opposite to the direction of rotation. These torques are superimposed upon the torque of the drive motor and thus produce torque fluctuations which have an effect upon the entire machine and, under certain circumstances, may excite vibrations in the machine frame or in the rotating parts. Such torque fluctuations may be caused, however, not only by springs, but also by masses which are set in cyclical motion by the control lever. The non-uniform motion of the masses generates acceleration forces which react to the cam.

It is accordingly an object to the invention to provide a transmission system which compensates for torque fluctuations resulting from the production of cyclical motions from rotary motions.

With the foregoing and other objects in view, there is provided, in accordance with the invention, a transmission system for forming cyclical motion from rotational motion including a device having a rotating part and at least one control lever set into cyclical motion by rotational motion of the rotating part, the one control lever and the rotating part being in cooperative engagement whereby a varying force is applied to the control lever producing a torque fluctuation in the rotational motion, includes another device for producing cyclical motion, the other device being in operative engagement with the rotating part, and spring means for applying a force to the rotating part so as to compensate for the torque fluctuation.

In accordance with another feature of the invention, the other device for producing cyclical motion is positively connected to the rotating part.

In accordance with an alternate feature of the invention, another rotating part is positively connected to the first-mentioned rotating part, the other device being positively connected to the other rotating part.

The apparatus according to the invention may be constructed so that there is precise compensation of the torque fluctuations, and, the cyclical motion formed from the rotary motion is thus reactionless, thereby assuring smooth operation of the printing press.

An advantage of the invention is to be seen in that the device, i.e. the spring, for producing the compensating force, need not act directly upon the rotating part, but it is also possible for the force to be applied to a further part, for example at a gearwheel which is in meshing engagement with the rotating part. This gearwheel may also, for example, rotate at half the speed of the rotating part. In this case, the cyclical motion of the device must be performed at double the frequency.

In accordance with a further feature of the invention, the first-mentioned device further includes a cam disposed on the rotating part, and the control lever has a roller at an end thereof in spring-loaded rolling contact with the cam, and the other device for producing cyclical motion comprises another cam on the rotating part, another control lever having a roller at an end thereof in rolling contact with the other cam, and spring means for applying a force to the roller of the other control lever so that a torque acting via the other cam on the rotating part is opposite in phase to a torque acting via the first-mentioned cam on the rotating part.

The shape of the other cam and the characteristic curve of the last-mentioned spring means are selected so that the two torque fluctuations caused by the control levers and acting upon the shaft cancel one another out.

Of course, it is just as possible, in accordance with the invention, for the cams to be set in rotary motion and for the control levers to be kept stationary, as it is for the cams to be held stationary and for the control levers to be made to rotate about the cams. In addition, it is also possible to provide one stationary and one rotating cam with corresponding control levers.

In accordance with an additional feature of the invention, the spring is also able to compensate for torque fluctuations produced by accelerated masses. Accelerated masses, for example, are articulated arrangements located after the control lever or the elements performing the cyclical motions. The torque fluctuations produced by these masses can be determined in a relatively simple manner for a given rotational speed, and the shape of the cam can be formed from the course or curve of the torque. In accordance with the invention, it is possible to form a single cam shape to compensate for the torque fluctuations produced both by the spring forces as well as by the forces due to the accelerated masses. Of course, it is also possible, however, to compensate separately for the variously produced torque fluctuations.

In accordance with a concomitant feature of the invention, the transmission system can be used in an advantageous manner on the gripper drum of a printing press. The motion of a gripper bridge disposed on a gripper drum is an oscillating motion usually generated by a cam. Likewise, the gripping motion itself which is performed by the grippers is initiated by a cam. Strong return springs are used to press the control lever, which is connected to the gripper bridge, against the cam in order, at high press speeds, to prevent the roller of the control lever from lifting away from the cam.

Other features which are considered as characteristic for the invention are set forth in the appended claims.

Although the invention is illustrated and described herein as embodied in transmission system for forming cyclical motion from rotational motion, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Like parts are identified by the same reference numerals in the figures of the drawing.

Figure 1:
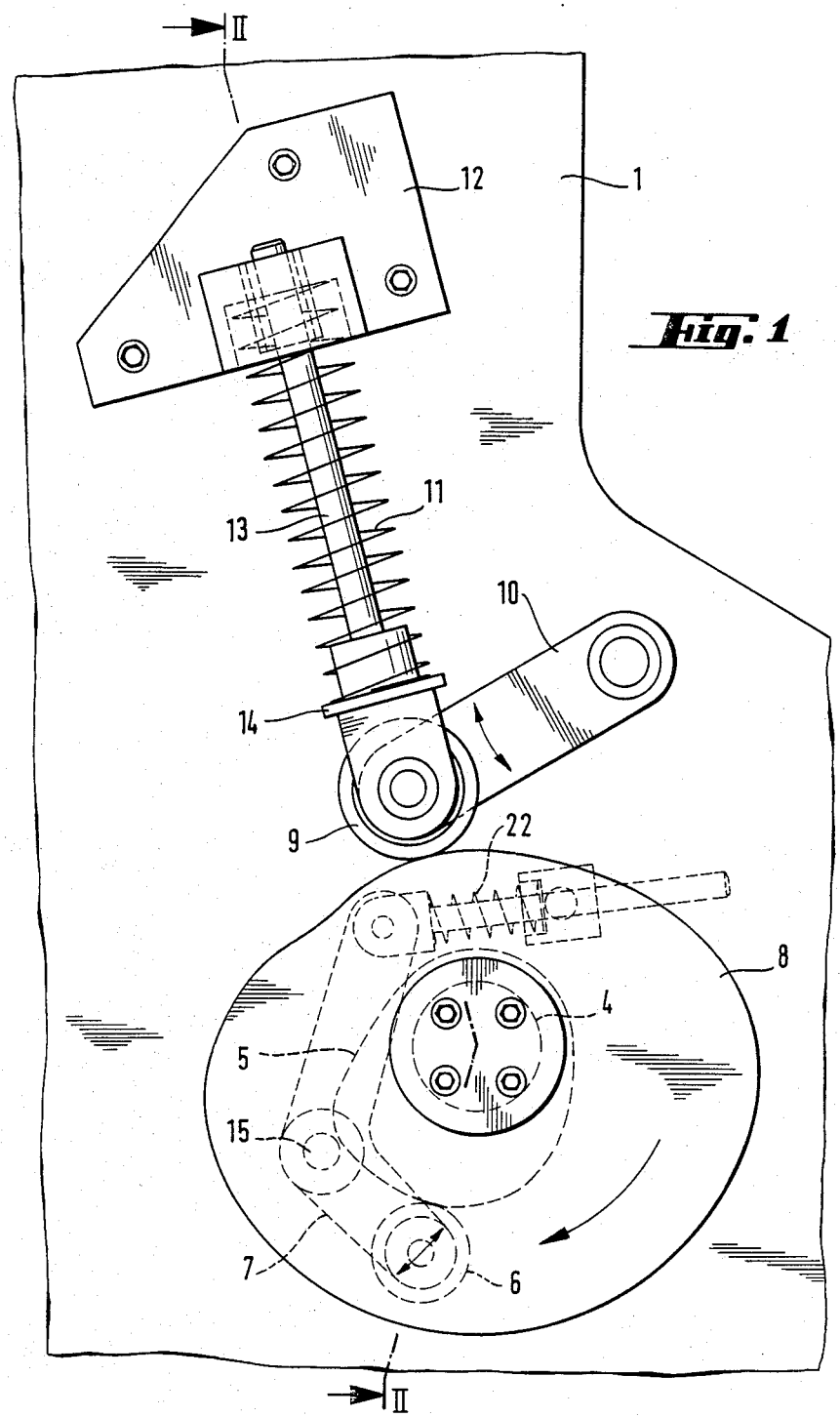
FIG. 1 is a diagrammatic front elevational view of one embodiment of a driving device according to the invention for producing an oscillating motion with torque.
Figure 2:
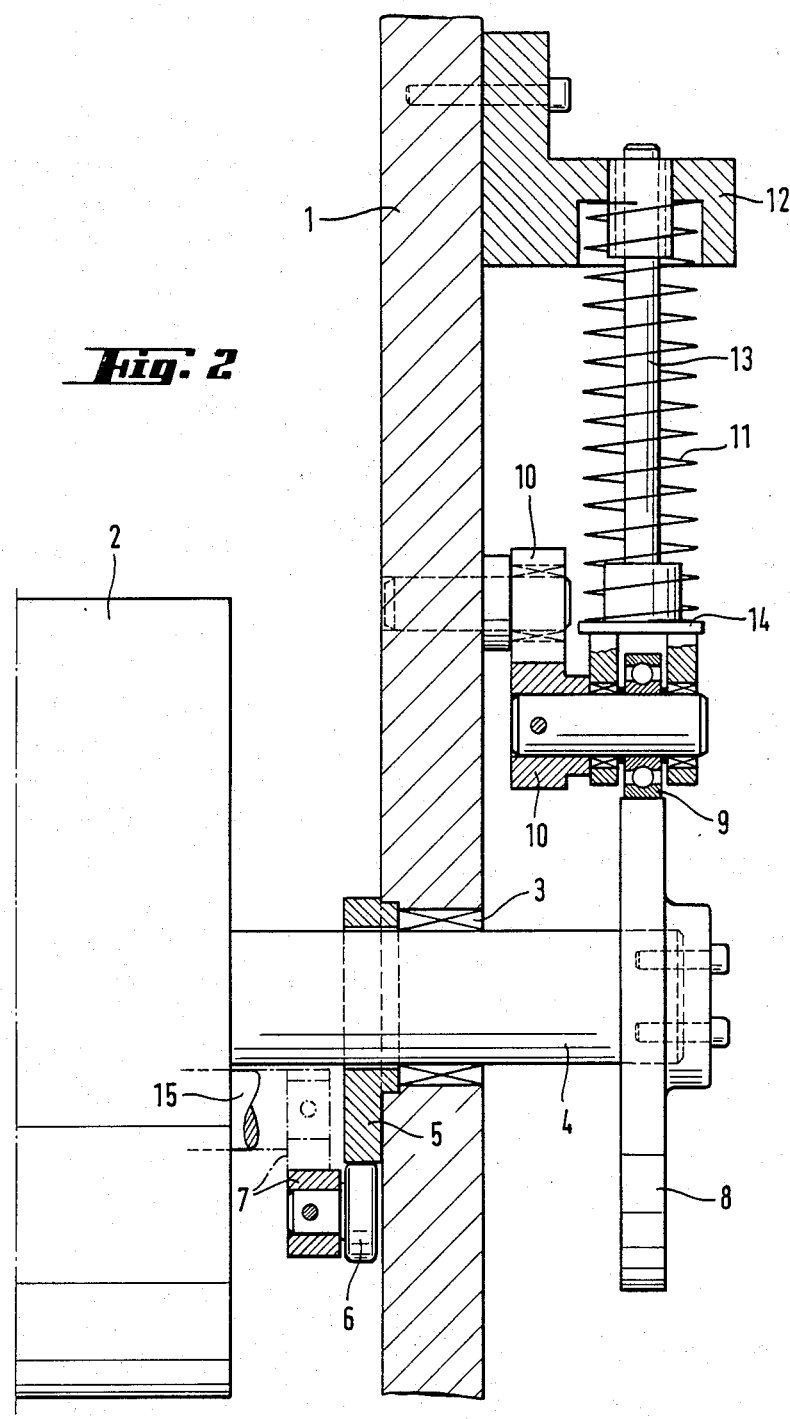
FIG. 2 is a longitudinal sectional view of FIG. 1.

Referring now more specifically to FIGS. 1 and 2 of the drawing, there is shown therein a driving device for producing an oscillating motion disposed on a drum 2, rotatably mounted via bearings 3 in a machine frame wall 1. This drum 2 is set in rotation, for example, by means of a motor in the other non-illustrated end thereof. Attached to the frame wall 1 and mounted concentrically or coaxially with respect to the shaft 4 of the drum 2 is a cam 5. The cam 5 is rigidly connected to the frame wall 1 and, at the center thereof, is formed with a bore, so that there is an air gap between the shaft 4 and the cam 5. A roller 6 fastened to the drum through the intermediary of a roller lever 7 rolls on the cam 5. A spring 22, inside the drum 2, applies a contact force between the roller 6 and the cam 5 which is so great that, even at high drum speeds, the roller 6 is prevented from lifting away from the cam 5. Due to the shape of the cam 5, the roller lever 7 performs a swiveling motion about a pivot bearing 15. This motion may, for example, control specific elements located inside the drum 2. The contact force generated by the compression spring 22 acts not only towards the center of the cam 5, but also produces torques of varying magnitude in the circumferential direction, depending upon the shape of the cam. These torques are superimposed on the drive torque both in positive as well as in negative direction. To compensate for these superimposed torques, a cam 8 is provided on the shaft 4. This cam 8 thus rotates with the drum 2. A roller 9 rolls on this cam 8 and is mounted on the frame wall 1 through the intermediary of a swivel lever 10. By means of a spring 11, a force is applied to the roller 9 causing the roller 9 likewise to be pressed against the cam 8. The spring 11 is supported at the roller end on a take-up or seating part 14 which is connected to the swivel lever 10. At its opposite end, the spring 11 rests on a support bearing 12. A guide pin 13 between the support bearing 12 and the take-up or seating part 14 prevents the spring 11 from tipping. The cam 8 is provided with such a shape that the torques produced by the force of the spring 11 are equal in magnitude to the torques produced by the contact force of the roller 6 against the cam 5 yet opposite in direction thereto. Thus, no fluctuating torques are superimposed any longer on the drive to que. Only the small constant frictional torques have to be overcome in addition to the output torques.

Figure 3:
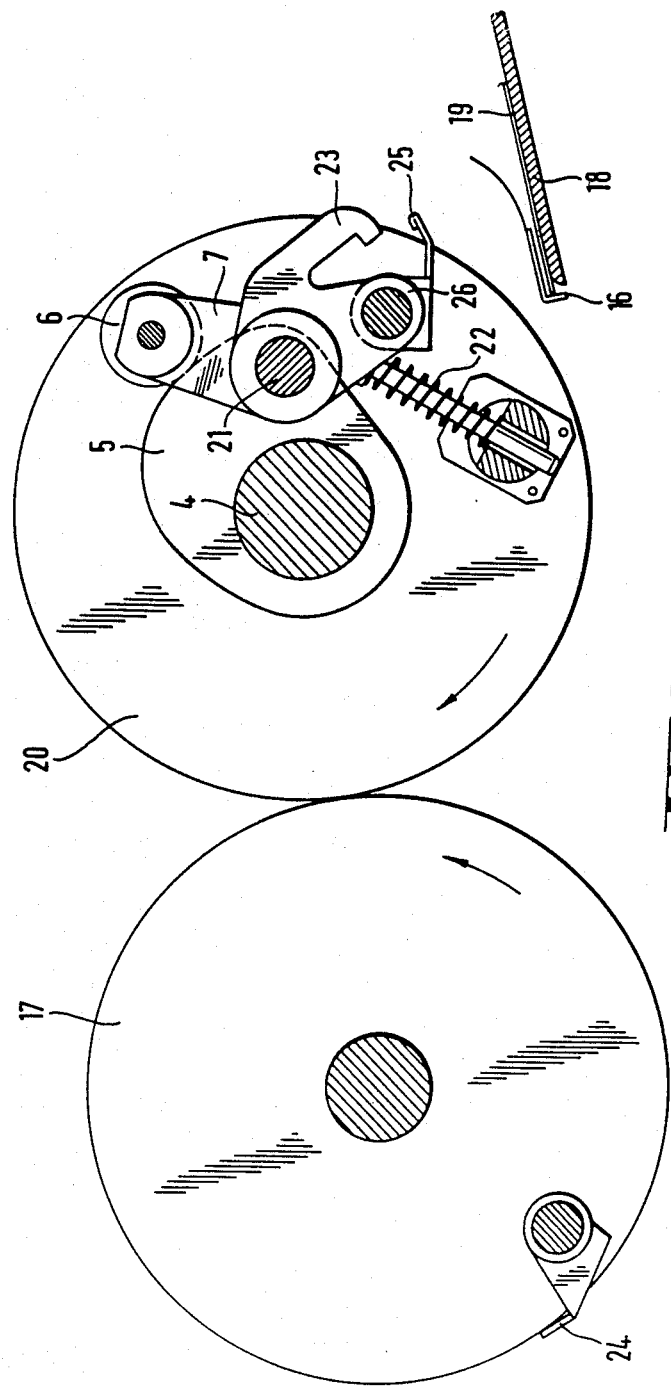
FIG. 3 is a diagrammatic front elevational view of another embodiment of the driving device for use with a pregripper.

FIG. 3 is a diagrammatic representation of a driving device of the type used for a pregripper of a sheet-fed printing press. As is known, for example, from the publication "Heidelberger Nachrichten 4/36" of Heidelberger Druckmaschinen Aktiengesellschaft, a paper sheet which has been taken from a pile and which is to be supplied to the printing press is brought up to press speed from rest, after precise positional alignment, and is transferred to the grippers of an impression cylinder. For this purpose, a register feed drum is provided which revolves at press speed. Located in this drum is a gripper bridge which is movable relative to the drum speed and which, during the transfer of the paper sheet, performs a motion opposite to the rotary motion of the register feed drum and thereby remains at rest. The gripper bridge subsequently adjusts to the speed of the register feed drum. The sheet is consequently slowly accelerated to press speed and, when the gripper bridge and the impression cylinder are in synchronism, is transferred to the impression cylinder. The motion of the gripper bridge is controlled by a cam.

The setup or construction for controlling the gripper bridge is described hereinafter in accordance with FIG. 3. Situated inside a rotating register feed drum 20 is a roller lever 7, which is pivotally mounted on a swivel bearing 21 disposed in the register feed drum 20. At one of the ends of the roller lever 7, there is a roller 6 which rolls along the stationary cam 5. The other end of the roller lever 7 is connected to a gripper bridge 23 which is rotatably disposed on the register feed drum 20 via the swivel bearing 21. The gripper bridge 23 is subjected via a compression spring 22 to a force which causes the roller 6 to be in contact with the cam 5. Due to the rotary motion of the register feed drum 20, the gripper bridge 23 and grippers 25 disposed thereon reach the paper sheet 19 which has been supplied via a feed table 18. The paper sheet 19 is located with its leading edge up against a stop, 16 and is accepted or taken over by the gripper bridge 23 while the stop 16 is simultaneously swung away, i.e. due to the swinging of a rocking lever 26, the paper sheet is gripped by its leading edge and is carried by the register feed drum 20 until it is transferred to the grippers 24 of the impression cylinder 17. The torque fluctuations which, due to the motions of the gripper bridge, are superimposed on the drive torque of the register feed drum 20 via the roller 6 which is supported on the cam 5 can be precisely compensated for, in accordance with the torque-compensation arrangement shown in FIGS. 1 and 2, by adding a non-illustrated cam with a spring-loaded roller which produces an appropriate torque characteristic. To determine the cam shape for the torque compensation, it is possible, for example, to measure the torque fluctuations produced by the gripper-bridge arrangement with a torque-measuring device and, from the thus measured torque characteristic, to calculate the spring force and the cam shape of the compensation apparatus.

The compensation device not only ensures compensation for torque fluctuations produced by specific cam shapes, but is also able to compensate for torque fluctuations caused by accelerated masses.

Figure 4:
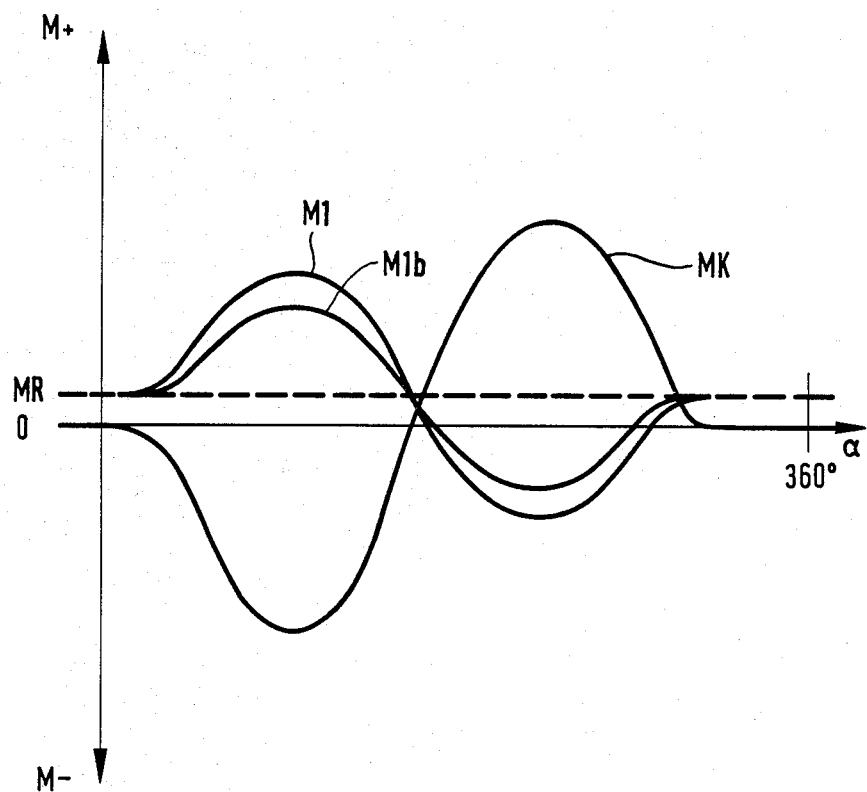
FIG. 4 is a plot diagram representing the torque compensation.

The plot diagram of FIG. 4 shows such a superimposition of torque fluctuations. A torque is represented on the ordinate of this figure. The abscissa shows an angle of rotation over a full revolution of a rotating body. M1 identifies a torque fluctuation which is caused by a spring-loaded roller on a cam. Underlying the torque fluctuation is a constant torque which is caused, for example, by frictional forces. A torque M1$b$ is caused by an accelerated and decelerated mass and likewise acts on the rotating part. To compensate for these two torques M1 and M1$b$, the rotating part is provided with a cam having a cam shape which, under the influence of a spring-loaded roller, exerts a torque as defined by a curve MK on the rotating part. The torque curve MK corresponds to the superimposition of the two torques M1 and M1$b$.

A marked advantage afforded by torque compensation, apart from a reduction in the maximum drive torque, is the prevention of torsional vibrations which may occur in the driven parts which lie between the drive motor and the rotating part and through which the torque fluctuations are introduced. These torsional vibrations, under certain circumstances, may possibly cause the excitation of vibrations in the entire machine. Such vibrations are avoided by the relatively simple installation of the aforementioned compensation device.

FIGS. 1 and 2 illustrate a representative embodiment of the invention in which one cam is stationary, and the cam for compensating for the torque fluctuations is rotatably mounted. Of course, it is also possible for both cams to be rotatable and for the rollers to be stationary and, in reverse, also for the cams to be stationary and for the rollers to be rotatable.

The foregoing is a description corresponding, in substance, to German application P No. 36 26 185.8, dated Aug. 1, 1986, International priority of which is being claimed for the instant application, and which is hereby made part of this application.

There is claimed:

1. Sheet-fed printing press having a register feed drum having sheet grippers thereon including a transmission system for forming cyclical motion from rotational motion so as to produce movement of said grippers located on the register feed drum including a device having a rotation part and at least one control lever set into cyclical motion by rotational motion of the rotating part, said one control lever being connected to said grippers, the one control lever and the rotating part being in cooperative engagement whereby a varying force resulting from nonuniformly acting forces and displaced masses of said grippers is applied to the control lever producing a torque fluctuation in the rotational motion, comprising another device for producing cyclical motion, said other device having a rotary cam in operative engagement with the rotating part, so as to rotate therewith, another control lever having a cam roller engaging with and rolling on said rotary cam and compressive spring means abutting a frame of the printing press and applying a force to and through said cam roller to the rotating part so as to counterbalance said acting forces and displaced masses of said grippers and compensate for the torque fluctuation, wherein the first-mentioned device further includes a cam disposed on the rotating part, and the one control lever has a roller in rolling contact with the cam of the first-mentioned device, and wherein said rotary cam is mounted on the rotating part, said cam roller being located on said other control lever, and wherein said compressive spring means applies a force to said roller of said other control lever so that a torque acting via said rotary cam on the rotating part is opposite in phase to a torque acting via the cam of the first-mentioned device disposed on the rotating part.

2. Transmission system according to claim 1 wherein said one control lever has a motion for producing take-up and surrendering motions of said grippers for advancing material to be printed, said compressive spring means for applying a force to said roller of said other control lever comprising a spring braced against the frame of the printing press and spring-loading said roller of said other control lever to compensate for torque.

3. Transmission system according to claim 1 wherein said one control lever has a motion for producing closing and opening motions of said grippers of the printing press, said compressive spring means for applying a force to said roller of said other control lever comprising a spring braced against the frame of the printing press and spring-loading said roller of said other control lever to compensate for torque.

4. Transmission system according to claim 1 wherein said other device is positively connected to the rotating part.

5. Transmission system according to claim 1 wherein said rotary cam is positively connected to the first-mentioned rotating part, said other device being positively connected to said other rotating part.

* * * * *